United States Patent
Hoshino et al.

(10) Patent No.: US 8,565,566 B2
(45) Date of Patent: Oct. 22, 2013

(54) MULTI-MODE OPTICAL FIBER

(75) Inventors: Sumio Hoshino, Yokohama (JP); Kazuhiro Yonezawa, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 209 days.

(21) Appl. No.: 13/253,445

(22) Filed: Oct. 5, 2011

(65) Prior Publication Data
US 2013/0089296 A1    Apr. 11, 2013

(51) Int. Cl.
G02B 6/028    (2006.01)

(52) U.S. Cl.
USPC ............................................. 385/124; 385/142

(58) Field of Classification Search
USPC .................................. 385/123–124, 141–143
See application file for complete search history.

(56) References Cited

U.S. PATENT DOCUMENTS

| | | | |
|---|---|---|---|
| 6,289,161 | B1 | 9/2001 | Schötz et al. |
| 6,292,612 | B1 | 9/2001 | Golowich et al. |
| 6,434,309 | B1 | 8/2002 | Abbott, III et al. |
| 6,535,679 | B2 * | 3/2003 | Yokoyama et al. ............ 385/127 |
| 6,724,965 | B2 | 4/2004 | Abbott, III et al. |
| 6,798,962 | B2 | 9/2004 | Berkey et al. |
| 7,769,263 | B1 * | 8/2010 | Bennett et al. ................ 385/125 |
| 7,787,731 | B2 | 8/2010 | Bookbinder et al. |
| 7,865,050 | B1 | 1/2011 | Sun |
| 2005/0063663 | A1 * | 3/2005 | Anderson et al. ............. 385/142 |
| 2009/0154888 | A1 | 6/2009 | Abbott, III et al. |
| 2010/0028020 | A1 | 2/2010 | Gholami et al. |
| 2010/0067858 | A1 | 3/2010 | Kim et al. |
| 2010/0098431 | A1 | 4/2010 | Donlagic |
| 2010/0272406 | A1 | 10/2010 | Bookbinder et al. |
| 2011/0058781 | A1 | 3/2011 | Molin et al. |
| 2011/0064367 | A1 | 3/2011 | Molin et al. |
| 2013/0129291 | A1 * | 5/2013 | Hoshino et al. ............... 385/123 |

FOREIGN PATENT DOCUMENTS

| | | |
|---|---|---|
| JP | 62-176941 | 8/1987 |
| JP | 2-81004 | 3/1990 |
| JP | 2002-53344 | 2/2002 |
| JP | 2004-93935 | 3/2004 |

* cited by examiner

*Primary Examiner* — Daniel Petkovsek
(74) *Attorney, Agent, or Firm* — Drinker Biddle & Reath LLP

(57) ABSTRACT

The present invention relates to a multi-mode optical fiber having a structure enabling stable production and broadening of communication bandwidth as compared with the conventional structures. The multi-mode optical fiber has a core with a diameter $2a$ that is doped with $GeO_2$ and chlorine. The chlorine concentration profile in the core along the diametric direction of the multi-mode optical fiber has a shape such that the chlorine concentration at a second measurement position within a range at a distance of from $0.9a$ to $1.0a$ from the center of the core in the radial direction thereof is higher than the chlorine concentration at a first measurement position at a distance of $a/2$ from the center of the core in the radial direction thereof.

2 Claims, 5 Drawing Sheets

MULTI-MODE OPTICAL FIBER

BACKGROUND OF THE INVENTION

1. Field of the Invention

The present invention relates to a multi-mode optical fiber.

2. Related Background Art

Multi-mode optical fibers are known to have transmission loss higher than that of single-mode optical fibers for long-haul optical communication because of the structure thereof. Meanwhile since the multi-mode optical fibers are easy to connect and make it possible to construct easily a network by using devices with low required performance, such fibers have been widely used in applications with local area information communication such as LAN (Local Area Network).

Recently, the techniques for reducing the transmission loss in the above-described multi-mode optical fibers and the expansion of communication bandwidth (transition to a broadband communication) have been actively researched with the object of improving signal quality in the above-described local area information communication.

SUMMARY OF THE INVENTION

The present inventors have examined a technique for producing broadband multi-mode optical fibers with good stability. In the present specification, the expression "optical fiber" means "multi-mode optical fiber", unless specifically stated otherwise.

Thus, in order to manufacture a broadband multi-mode optical fiber with good stability, it is necessary to match accurately the refractive index profile in the diametric direction of the fiber with the desired shape. In order to obtain the desired shape of refractive index profile, firstly, it is necessary to add $GeO_2$ to obtain the correct concentration in the diametric direction, but such a measure is not always sufficient. For example, in an optical fiber obtained after drawing a preform, the refractive index profile slightly varies under the effect of residual stresses inside the optical fiber. In this case, it is important to reduce somehow the effect of residual stresses on refractive index fluctuations or maintain the same profile at all times in the optical fiber production process. The residual stresses are affected by tension applied to the optical fiber when the preform is drawn and solidification conditions of the drawn optical fiber. It would be desirable to reduce the residual stresses to zero, but in fact it is difficult. For example, when the optical fiber is cooled after drawing, the optical fiber temperature decreases from the surface of the optical fiber toward the interior thereof, and glass serving as a fiber material solidifies as the fiber cooling process proceeds, and as a result, stresses can remain inside the optical fiber under certain solidification conditions. In particular, since $GeO_2$ has been added to the core and the expansion coefficient of the core is higher than that of the cladding, the core shrinks significantly during fiber cooling and stresses caused by such shrinking also remain in the obtained optical fibers.

With consideration for the above-described facts, the inventors have discovered that the timings of glass solidification in sections along the diametric direction can be brought very close to each other by purposefully controlling the chlorine concentration profile in the multi-mode optical fiber that is being produced. This finding led to the creation of the present invention.

The present invention has been developed to eliminate the problems described above. It is an object of the present invention to provide a multi-mode optical fiber having a structure that can be produced with good stability with a communication bandwidth broader than that in the conventional structures.

The present invention relates to a multi-mode optical fiber of a GI (Graded Index) type, and such a multi-mode optical fiber is clearly distinguishable from single-mode optical fibers for long-haul transmission.

Thus, the multi-mode optical fiber according to the present invention comprises a core doped with $GeO_2$ (germanium dioxide) and extending along a predetermined axis, and a cladding provided on an outer periphery of the core and having a refractive index lower than that of the core. In a refractive index profile in the diametric direction of the multi-mode optical fiber, an $\alpha$ value of a portion corresponding to the core is 1.9 to 2.2, a maximum relative refractive index difference $\Delta$ between the core and a reference region in the cladding is 0.8 to 1.2%, and a diameter $2a$ of the core is 47.5 to 52.5 μm.

In the multi-mode optical fiber of the above-described configuration, the core is doped with chlorine, and the chlorine concentration profile in the core, in the diametric direction of the multi-mode optical fiber, has a shape such that the chlorine concentration at the second measurement position within a range at a distance of from 0.9 a to 1.0 a from the center of the core in the radial direction thereof is higher than the chlorine concentration at the first measurement position at a distance of a/2 from the center of the core in the radial direction thereof.

Thus, in the core of the multi-mode optical fiber, the chlorine concentration is intentionally controlled within an annular region including the outer periphery of the core where the variation in $GeO_2$ doping concentration is especially high and surrounding the center of the core (position with the maximum relative refractive index difference). More specifically, the difference in glass viscosity between the center portion and peripheral portion of the core can be reduced by increasing the chlorine concentration in the outer portion that is closer to the outer peripheral surface of the core over the chloride concentration in the inner portion of the annular region that is closer to the center of the core. As a result, residual stresses in the multi-mode optical fiber that is obtained by drawing a preform can be reduced and broadening of the communication bandwidth can be realized.

Further, in the multi-mode optical fiber according to the present invention, the chlorine concentration profile in the core preferably has a shape such that the chlorine concentration increases monotonously along the radial direction of the core in a range between the first measurement position and the second measurement position.

As described above, in the multi-mode optical fiber according to the present invention, the difference in refractive index profile between the states before and after the drawing of the preform is inhibited. Therefore, the present invention is particularly applicable to broadband multi-mode optical fibers. More specifically, the present invention can be applied to broadband multi-mode optical fibers called OM3 and OM4 that are stipulated by the International Standard ISO/IEC 11801. For example, the OM3 multi-mode optical fiber represents a fiber in which the bandwidth called a minimum effective bandwidth is equal to or greater than 2000 MHz·km and a bandwidth at full mode oscillation (OFL bandwidth stipulated by the International Standard IEC 60793-1-41) is equal to or greater than 1500 MHz·km at 850 nm and equal to or greater than 500 MHz·km at 1300 nm.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1A:
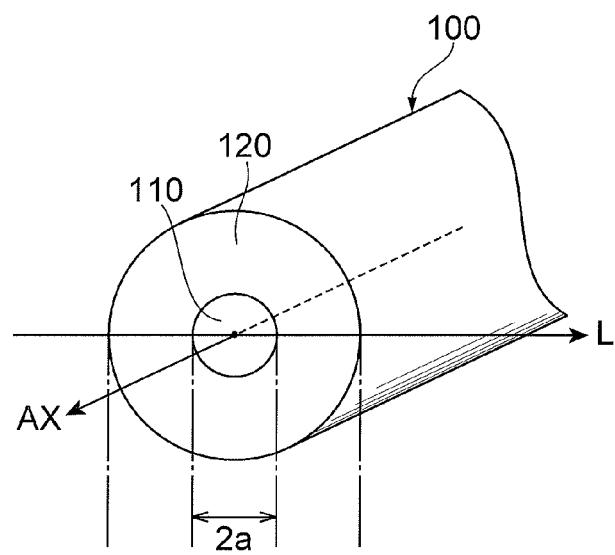
FIG. 1A shows a representative cross-sectional structure of a multi-mode optical fiber according to the present invention.

In the following, embodiments of the multi-mode optical fiber according to the present invention will be explained in detail with reference to FIGS. 1A, 1B, 2, 3, 4A to 5B, and 6 to 8. In the description of the drawings, identical or corresponding components are designated by the same reference numerals, and overlapping description is omitted.

Figure 1B:
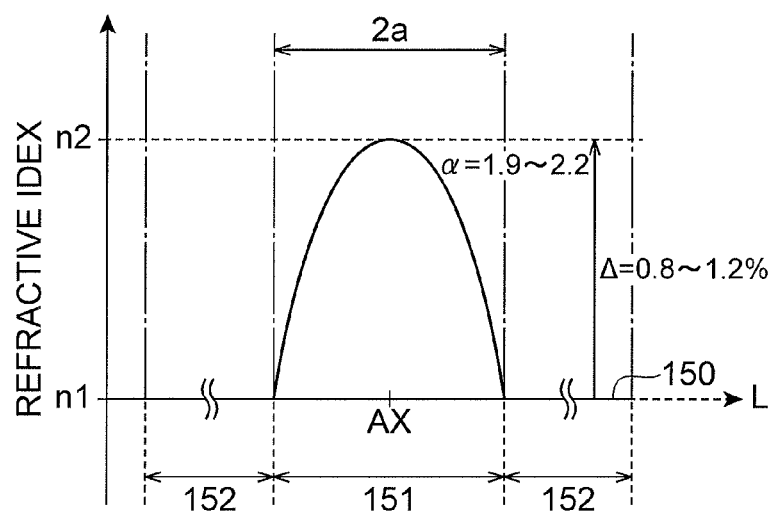
FIG. 1B shows a refractive index profile thereof.

FIG. 1A shows a representative cross-sectional structure of the multi-mode optical fiber according to the present invention. FIG. 1B shows a refractive index profile thereof. In particular, a multi-mode optical fiber 100 (FIG. 1A) according to the present embodiment is a GI-type multi-mode optical fiber mainly composed of silica glass and comprising, at least, a core 110 extending along the predetermined axis (coincides with an optical axis AX) and a cladding 120 provided on the outer periphery of the core 110. In the multi-mode optical fiber 100 shown in FIG. 1A, the core 110 is doped with $GeO_2$ for adjusting the shape of refractive index profile and has a diameter $2a$ and a maximum refractive index $n2$. The cladding 120 has a refractive index $n1$ lower than that of the core 110. In addition to the above-described $GeO_2$, the core 110 is also doped with chlorine with a concentration adjusted in each portion in the core 110 so as to form the desired concentration profile shape.

Further, the multi-mode optical fiber 100 according to the present embodiment has a refractive index profile 150 shown in FIG. 1B. The refractive index profile 150 shown in FIG. 1B represents the refractive index in each portion on the line L (matches the diametric direction of the multi-mode optical fiber 100) orthogonal to the optical axis Ax. More specifically, a region 151 demonstrates a refractive index in each portion of the core 110 along the line L, and a region 152 demonstrates a refractive index of each portion of the cladding 120 along the line L.

In particular, the region 151 in the refractive index profile 150 shown in FIG. 1B has a dome shape such that the refractive index is at a maximum in the center of the core 110 that matches the optical axis AX. Therefore, the concentration of $GeO_2$ doped to adjust the refractive index also decreases rapidly from the center of the core 110 toward the cladding 120. An α value that defines the dome shape is 1.9 to 2.2. The relative refractive index difference Δ (maximum relative refractive index difference between the core 110 and the cladding 120) between the center of the core 110 and the cladding (in the example shown in FIG. 1A, the cladding is constituted by a single layer and becomes a reference area that defines the relative refractive index difference) 120 is 0.8 to 1.2% and the diameter $2a$ of the core 110 is 47.5 to 52.5 μm.

Figure 2:
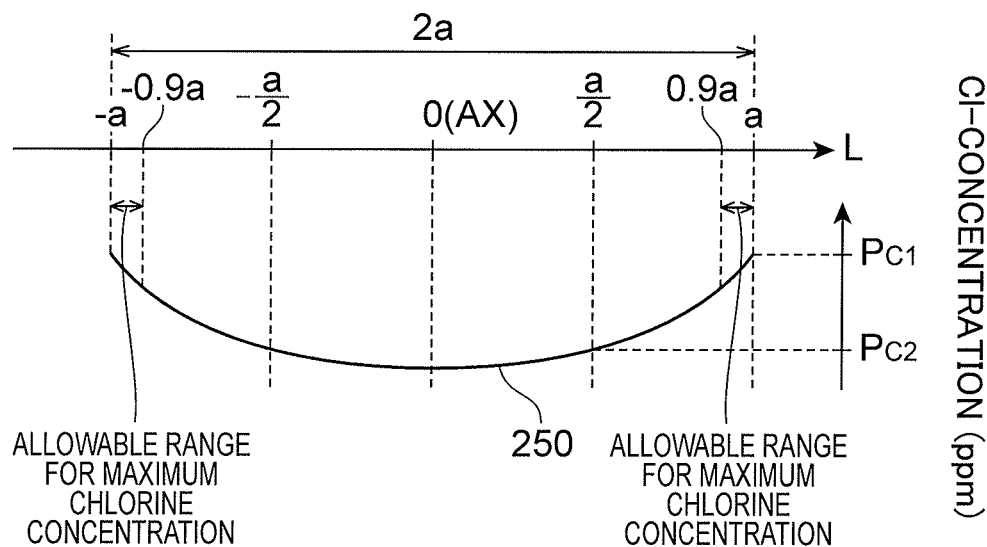
FIG. 2 shows a chlorine concentration profile in the core that is used in the multi-mode optical fiber according to the present invention.

The concentration profile of chlorine doped together with $GeO_2$ into the core 110 has a shape such as shown in FIG. 2. In FIG. 2, the transverse axis corresponds to each portion of the core 110 with the diameter $2a$ on the line L and represents a coordinate with an origin point at the intersection with the optical axis.

A chlorine concentration profile 250 shown in FIG. 2 is a profile along the diametric direction (direction orthogonal to the optical axis AX) of the multi-mode optical fiber 100, and the shape of the chlorine concentration profile is such that the chlorine concentration is at a minimum in the center of the core 110 and at a maximum within a range at a distance of 0.9 a to 1.0 a (distance almost equal to the radius of the core 110) from the center of the core 110 in the radial direction thereof. Further, in FIG. 2, the chlorine concentration is shown to be at a maximum at a position of 1.0 a for the sake of convenience. Thus, in the core 110, the chlorine concentration is intentionally controlled so as to demonstrate especially significant changes in an annular region surrounding the center of the core 110 which is a peripheral region including the outer periphery of the core 110 where variations in $GeO_2$ doping concentration are particularly large.

More specifically, the chlorine concentration (units: ppm) at the first measurement position at a distance $a/2$ from the center of the core 110 that matches the optical axis AX in the radial direction thereof is set to $P_{C2}$, whereas a portion with a chlorine concentration (units: ppm) $P_{C1}$ ($>P_{C2}$) is set at the second measurement position within a range at a distance of 0.9 a to 1.0 a from the center of the core 110 that matches the optical axis AX in the radial direction thereof. By so increasing the chlorine concentration in the peripheral portion that is closer to the cladding 120 with respect to the chlorine concentration in the portion that is closer to the center of the core 110 within a range of the distance $a/2$ to a from the center of the core 110, it is possible to reduce the difference in glass viscosity between the center region and the peripheral region of the core 110. As a result, residual stresses inside the multi-mode optical fiber obtained by drawing the preform are reduced and broadening of the communication bandwidth can be realized.

The shape of the chlorine concentration profile within a range of the distance a/2 to a from the center of the core 110 is not limited to that shown in FIG. 2. Thus, the chlorine concentration profile in the core 110 may have any of the shapes shown in FIG. 3, provided that the shape is such that the chlorine concentration increases monotonously along the radial direction of the core 110 within the above-described range of the distance a/2 to a.

Figure 3:
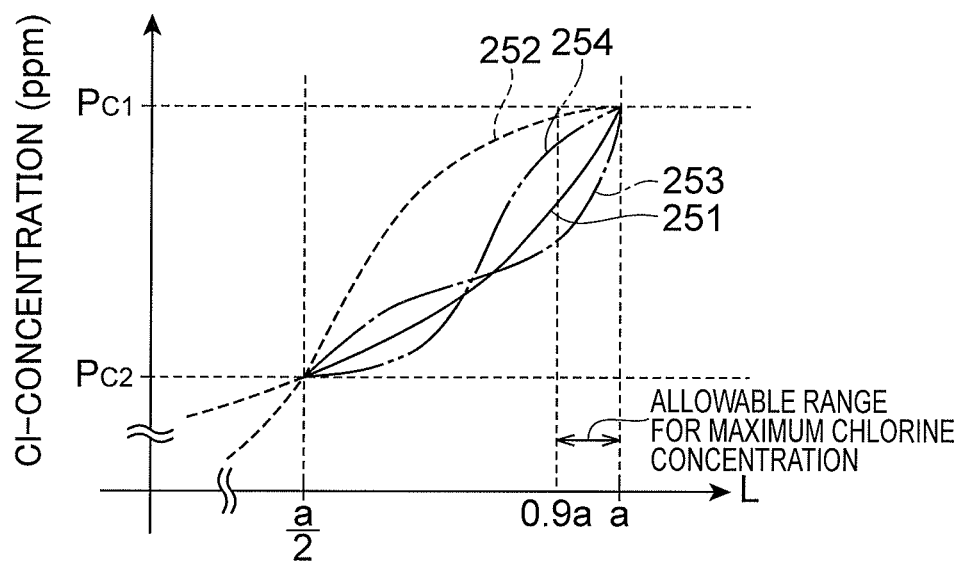
FIG. 3 shows allowable changes in the shape of the chlorine concentration profile shown in FIG. 2.

For example, a concentration profile 251 shown in FIG. 3 has a shape matching that of the concentration profile 250 shown in FIG. 2. A concentration profile 252 has a shape such that the increase rate of chlorine concentration (Cl-concentration) decreases from the center of the core 110 toward the cladding 120. A concentration profile 253 has a shape such that the increase rate of chlorine concentration (Cl-concentration) increases, decreases, and then again increases from the center of the core 110 toward the cladding 120. A concentration profile 254 has a shape such that the increase rate of chlorine concentration (Cl-concentration) decreases, increases, and then again decreases from the center of the core 110 toward the cladding 120. Any of the concentration profiles 251 to 254 can be used as the chlorine concentration profile in the core 110. In FIG. 3, similarly to FIG. 2, the chlorine concentration is shown to be at a maximum at a position of 1.0 a, for the sake of convenience.

A method of manufacturing the multi-mode optical fiber 100 according to the present embodiment will be described below.

In order to obtain the multi-mode optical fiber 100, first, an optical fiber preform 600 (see FIG. 8) is produced. The optical fiber preform 600 can be obtained by producing a core preform doped with $GeO_2$ (germanium dioxide) by an OVD (Outside Vapor phase Deposition) method, then performing dehydration, sintering, and stretching, and then producing a peripheral portion by a VAD (Vapor phase Axial Deposition) on the outer periphery of the obtained core preform. The core preform produced by the OVD method is a portion that should become the core 110 having a refractive index profile with an α value of 1.9 to 2.2 after drawing. The peripheral portion produced by the VAD method is a portion that should become the cladding 120 after drawing.

Figure 4A:
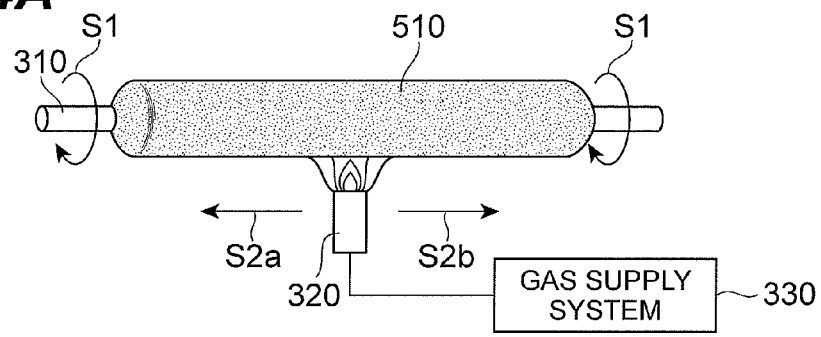
FIG. 4A shows an OVD method and a device configuration therefor.

In the initial production step performed by the OVD method, a porous preform 510 is produced by a soot deposition apparatus shown in FIG. 4A. The soot deposition apparatus has a structure in which a center rod 310 (may also be a hollow glass tube) is held in a state in which the center rod can be rotated in the direction shown by arrow S1. The soot deposition apparatus is provided with a burner 320 for forming the porous preform 510 along the center core 310 and a gas supply system 330 for supplying a starting material gas. The burner 320 can be moved by a predetermined moving mechanism in the directions shown by arrows S2a and S2b in FIG. 4A.

When the porous preform 510 is produced, fine glass particles are generated by a hydrolysis reaction of the starting material gas supplied from the gas supply system 330 in the flame of the burner 320, and these fine glass particles are deposited on the side surface of the center core 310. In this process, the center core 310 is rotated in the direction shown by arrow S1 and the burner 320 is moved along the directions shown by arrows S2a and S2b. As a result of these operations, a porous glass body grows along the center core 310 and a porous preform 510 (soot preform) that should become the core 110 is obtained.

Figure 4B:
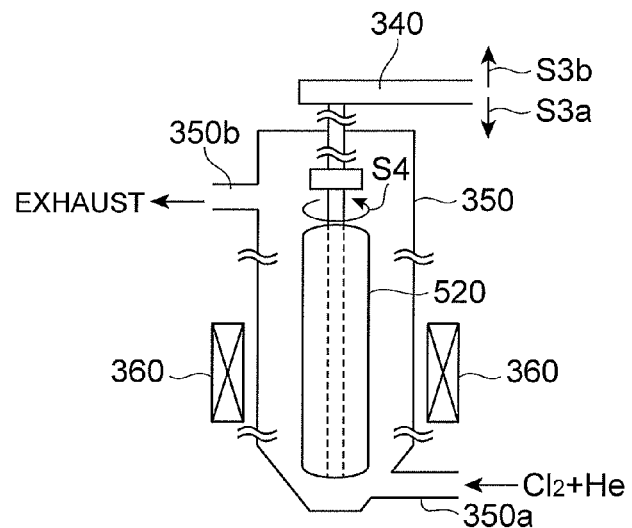
FIG. 4B shows a dehydration process (chlorine doping process) and a device configuration therefor.

The porous preform 510 produced by the OVD method in the above-described manner is then subjected to dehydration (chlorine doping process) shown in FIG. 4B. Prior to the dehydration process, the center core 310 is pulled out from the obtained porous preform 510, but when the center core 310 is a hollow glass tube, the hollow glass tube can be removed by introducing an etching gas thereinto after the hydrolysis and sintering processes. The porous preform 510 that has been subjected to such pretreatment is disposed inside a heating container 350 that is shown in FIG. 4B and provided with a heater 360 and dehydration treatment is performed in a chlorine-containing atmosphere. The heating container 350 is provided with an introducing port 350a for supplying a chorine-containing gas and a discharge port 350b. In the course of the dehydration process, the support mechanism 340 moves the entire porous preform 510 in the direction shown by arrows S3a and S3b, while rotating the porous preform 510 in the direction shown by arrow S4 about the center axis of the porous preform 510 as a center, thereby changing the position of the porous preform 510 relative to the heater 360. A porous preform 520 doped with a predetermined amount of chlorine is obtained by means of these processes.

The dehydration process is implemented in two stages in order to dope the inside of the preform effectively with chlorine. Thus, in the first stage, the temperature inside the container 350 is set to 1150° C. (heater temperature), a mixed gas of chlorine gas ($Cl_2$) and helium gas with a chlorine gas concentration of 4% is supplied from the introducing port 350a into the container 350 and the dehydration of the porous preform 510 is performed. In the second stage, the temperature inside the container 350 is reset to 1350° C. (heater temperature), a mixed gas of chlorine gas ($Cl_2$) and helium gas with a chlorine gas concentration of 7% is supplied from the introducing port 350a into the container 350, and the porous preform 520 doped with a predetermined amount of chlorine is obtained.

Figure 4C:
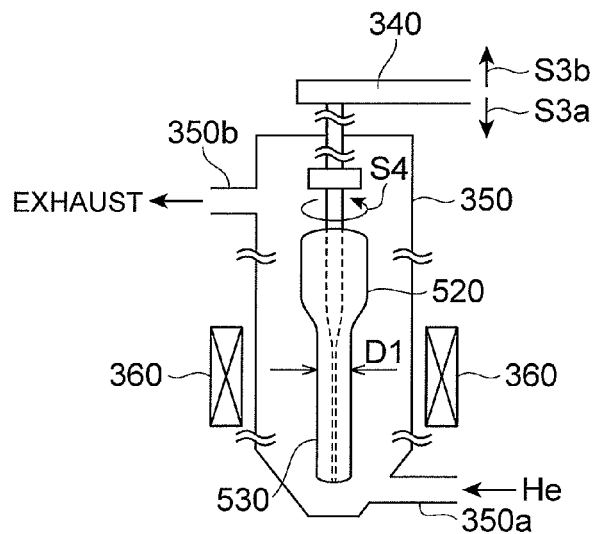
FIG. 4C shows a sintering process (vitrification process) and a device configuration therefor.

The porous preform 520 obtained in the above-described dehydration process (chlorine doping process) is then sintered (vitrified) inside the above-described heating container 350. Thus, as shown in FIG. 4C, the porous substrate 520 supported by the support mechanism 340 is accommodated inside the container 350. At this time, the temperature inside the container 350 (heater temperature) is set to 1500° C., and helium gas is supplied into the container 350 through the introducing port 350a.

In the course of the sintering process, the support mechanism 340 moves the entire porous preform 520 in the direction shown by arrow S3a, while rotating the porous preform 520 in the direction shown by arrow S4 about the center axis of the porous preform 520 as a center, thereby changing the position of the porous preform 520 relative to the heater 360. After this process, a compacted transparent glass body 530 with a diameter D1 is obtained by reducing the pressure inside the center hole and conducting heating to collapse the center hole.

Figure 5A:
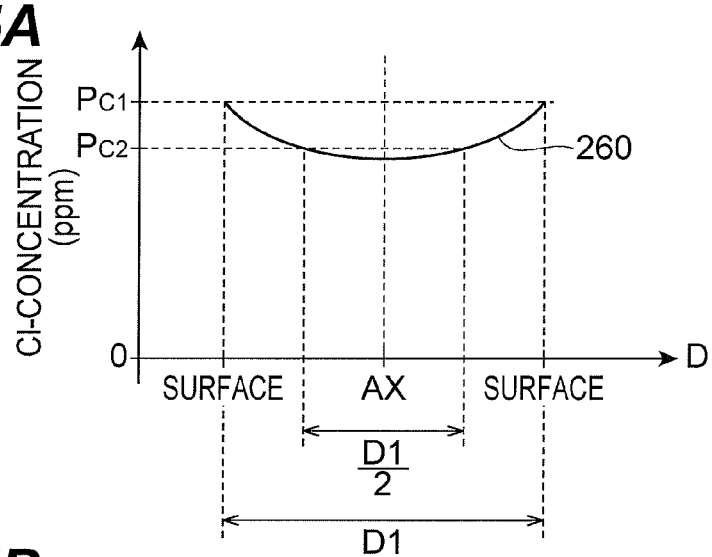
FIG. 5A shows a chlorine concentration profile of a transparent glass body (portion that will serve as a core after drawing) after sintering (FIG. 4C) performed to obtain a multi-mode optical fiber according to an embodiment.

FIG. 5A shows a chlorine concentration profile 260 (profile along the diametric direction of a transparent glass body 530 that is orthogonal to the center axis of the transparent glass body 530) of the transparent glass body 530 obtained by the above-described processes. In FIG. 5A, the abscissa shows the position of each portion of the transparent glass body 530 on the line D orthogonal to the center axis (AX) of the transparent glass body 530. The average chlorine concentration in the obtained transparent glass body 530 is 1500 ppm. As can be seen from FIG. 5A, the chlorine concentration $P_{C1}$ at a position at a distance of D1/2 (surface of the transparent glass body 530) in the radial direction from the center (for the sake of convenience, the center is shown by AX in the figure) is higher than the chlorine concentration $P_{C2}$ at a position of D1/4 (intermediate value of radius D1/2 of the transparent glass body 530) in the radial direction from the center of the transparent glass body 530 (for the sake of convenience, the center is shown by AX in the figure).

Figure 5B:
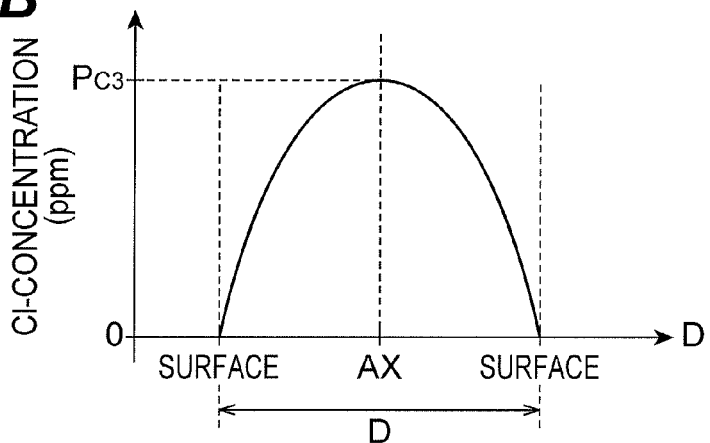
FIG. 5B shows a chlorine concentration profile in a center portion of the preform (portion that will serve as a core after drawing) after sintering (FIG. 4C) performed to obtain a multi-mode optical fiber according to a comparative example which has been produced anew for comparison with the embodiment.
Figure 6:
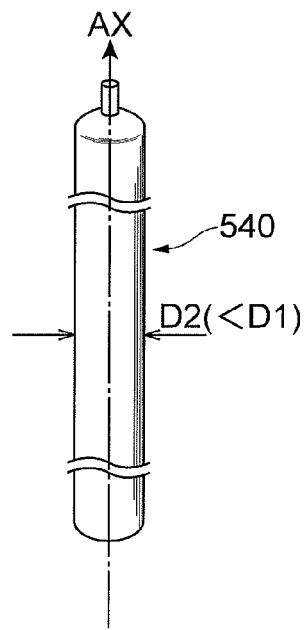
FIG. 6 illustrates the structure of the core preform after stretching.

In order to produce a multi-mode optical fiber according to a comparative example that is used for comparison of optical characteristics with the multi-mode optical fiber according to the embodiment that is finally manufactured by using the transparent glass body having the above-described chlorine concentration profile 260, the inventors have also produced a transparent glass body having a chlorine concentration profile in which the chlorine concentration becomes a maximum concentration $P_{C3}$ in the center matching the center axis AX, as shown in FIG. 5B, and decreases rapidly in the peripheral region. Such a transparent glass body is produced by implementing only the above-described first stage in the dehydration process.

A core preform 540 is obtained by stretching the transparent glass body 530 produced in the above-described manner in the longitudinal direction thereof so as to obtain a diameter D2 (in the present embodiment, 20 mm).

The above-described process of producing the porous preform, dehydration process, and sintering process can be performed in the same container.

A preform for a multi-mode optical fiber is finally produced by forming a glass region by a VAD method on the surface of the core preform 540 obtained by the above-described processes.

Figure 7:
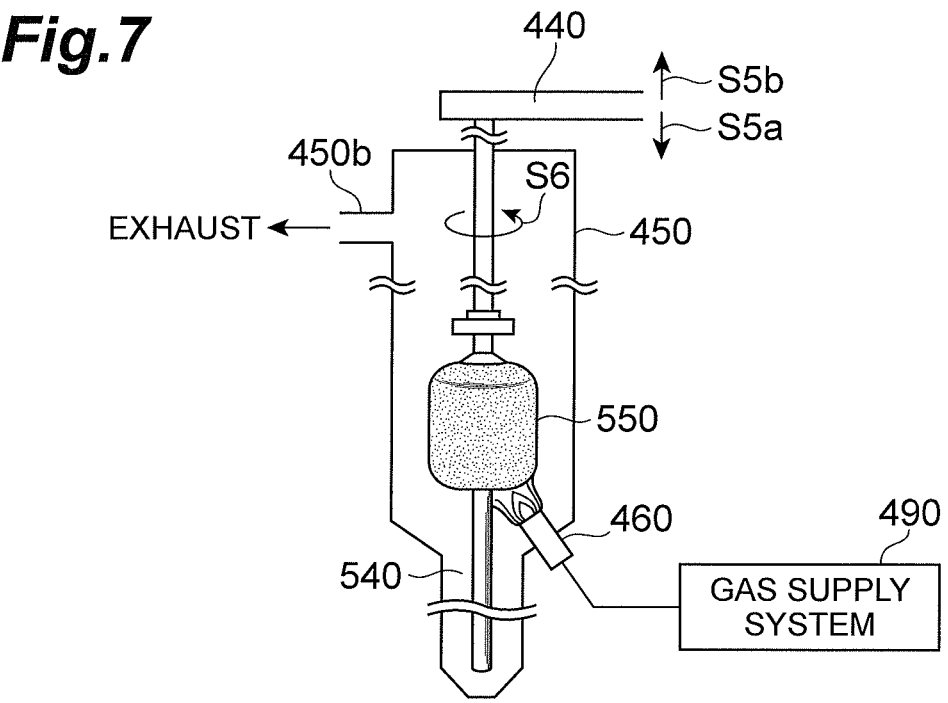
FIG. 7 shows the VAD method and a device configuration therefor.

More specifically, in the production process using the VAD method, a porous glass body 550 is formed on the surface of the core preform 540 by a soot deposition apparatus shown in FIG. 7. The soot deposition apparatus is provided with a container 450 having at least a discharge port 450b and a support mechanism 440 for supporting the core preform 540. Thus, a support rod that can rotate in the direction shown by arrow S6 is provided in the support mechanism 440, and the core preform 540 for growing the porous glass body 550 (soot body) on the surface thereof is attached to the distal end of the support rod.

The soot deposition device shown in FIG. 7 is provided with a burner 460 for depositing the porous glass body 550 (soot body) on the surface of the core preform 540. The desired starting material gas (for example, $SiCl_4$), fuel gas ($H_2$ and $O_2$), and carrier gas such as Ar or He are supplied from a gas supply system 470 to the burner 460.

In the production of the porous glass body 550, fine glass particles are generated by a hydrolysis reaction of the starting material gas supplied from the gas supply system 490 in the flame of the burner 460, and these fine glass particles are deposited on the surface of the core preform 540. In this process, the support mechanism 440 performs the operation of moving the core preform 540 provided at the distal end thereof in the direction shown by arrow S5a and then pulling the core preform 540 up along the direction (longitudinal direction of the core preform 540) shown by arrow S5b, while rotating the core preform in the direction shown by arrow S6. As a result of these operations, the porous glass body 550 is grown downward of the core preform 540 on the surface of the core preform 540 and eventually a porous preform (soot preform) is obtained that should become the clad portion 120 on the surface of the core preform 540.

The porous preform obtained by the above-described processes is again subjected to the dehydration process (FIG. 4B) and sintering process (FIG. 4C), and a preform 600 for a multi-mode optical fiber is obtained.

Figure 8:
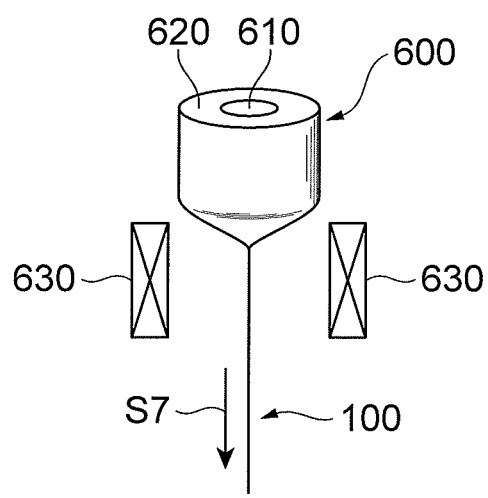
FIG. 8 shows a drawing process of the optical fiber preform and a device configuration therefor.

As shown in FIG. 8, this optical fiber preform 600 is provided with a region that should serve as the core 110 and a peripheral region that should serve as the cladding 120 after drawing. In the drawing process shown in FIG. 8, one end of the optical fiber preform 600 is drawn in the direction shown by arrow S7, while being heated by the heater 630. As a result, the multi-mode optical fiber 100 having a cross-sectional structure shown in FIG. 1A is obtained.

The multi-mode optical fiber according to the present embodiment that has been finally obtained from the transparent glass body 530 having the chlorine concentration profile 260 shown in FIG. 5A was confirmed to be a broadband multi-mode optical fiber (multi-mode optical fiber of OM3 type) with a minimum effective bandwidth of 5600 MHz·km and an OFL bandwidth of 4720 MHz·km at 850 nm.

Meanwhile, the multi-mode optical fiber according to the comparative example that has been finally obtained from the transparent glass body having the chlorine concentration profile shown in FIG. 5B had a minimum effective bandwidth of 1520 MHz·km and an OFL bandwidth of 1250 MHz·km at 850 nm, and as a result, a multi-mode optical fiber of OM3 type could not be obtained.

As described above, in accordance with the present invention, the difference in refractive index profile between the states before and after the preform drawing can be inhibited. Therefore, the present invention is particularly applicable to broadband multi-mode optical fibers. More specifically, the present invention can be applied to broadband multi-mode optical fibers called OM3 and OM4 that are stipulated by the International Standard ISO/IEC 11801.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-mode optical fiber comprising:
    a core doped with $GeO_2$ and extending along a predetermined axis; and
    a cladding provided on an outer periphery of the core and having a refractive index lower than that of the core,
    wherein, in a refractive index profile in a diametric direction of the multi-mode optical fiber, an α value of a portion corresponding to the core is 1.9 to 2.2, a maximum relative refractive index difference Δ between the core and a reference region in the cladding is 0.8 to 1.2%, and a diameter 2a of the core is 47.5 to 52.5 µm, and
    wherein the core is doped with chlorine, and a chlorine concentration profile in the core, in the diametric direction of the multi-mode optical fiber, has a shape such that a chlorine concentration at a second measurement position within a range at a distance of from 0.9 a to 1.0 a from a center of the core in a radial direction thereof is higher than a chlorine concentration at a first measurement position at a distance of a/2 from the center of the core in the radial direction thereof.

2. The multi-mode optical fiber according to claim 1, wherein the chlorine concentration profile in the core has a shape such that the chlorine concentration increases monotonously along the radial direction of the core in a range between the first measurement position and the second measurement position.

* * * * *